US008914377B2

(12) United States Patent
Hornkvist et al.

(10) Patent No.: US 8,914,377 B2
(45) Date of Patent: *Dec. 16, 2014

(54) METHODS FOR PREFIX INDEXING (71) Applicant: Apple Inc., Cupertino, CA (US)

(72) Inventors: John M. Hornkvist, Cupertino, CA (US); Eric R. Koebler, Aptos, CA (US)

(73) Assignee: Apple Inc., Cupertino, CA (US)

( * ) Notice: Subject to any disclaimer, the term of this patent is extended or adjusted under 35 U.S.C. 154(b) by 193 days.

This patent is subject to a terminal disclaimer.

(21) Appl. No.: 13/746,837

(22) Filed: Jan. 22, 2013

(65) Prior Publication Data

US 2013/0159315 A1 Jun. 20, 2013

Related U.S. Application Data (63) Continuation of application No. 12/913,509, filed on Oct. 27, 2010, now Pat. No. 8,364,684.

(51) Int. Cl.
G06F 7/00 (2006.01)
G06F 17/30 (2006.01)
(52) U.S. Cl.
CPC .... *G06F 17/30946* (2013.01); *G06F 17/30619* (2013.01)
USPC ........................................................ 707/741
(58) Field of Classification Search
None
See application file for complete search history.

(56) References Cited

U.S. PATENT DOCUMENTS

| 7,370,035 | B2 | 5/2008 | Gross et al. |
| 2003/0023581 | A1 | 1/2003 | Davis et al. |
| 2006/0064397 | A1 | 3/2006 | Ohtani |
| 2006/0074997 | A1 | 4/2006 | Chiu et al. |
| 2007/0027853 | A1 | 2/2007 | Hajela et al. |
| 2007/0043704 | A1 | 2/2007 | Raub et al. |
| 2007/0043714 | A1 | 2/2007 | Stanton et al. |
| 2007/0043750 | A1 | 2/2007 | Dingle |
| 2009/0094270 | A1 | 4/2009 | Alirez et al. |

OTHER PUBLICATIONS

PCT Notification of Transmittal of the International Search Report and Written Opinion of the International Searching Authority, or the Declaration, for the PCT Int'l. Appln. No. PCT/US2011/056962,mailed Jan. 26, 2012. (10 pages).
Navarro, Gonzalo, et al., "Modern Information Retrieval, Chapter: Indexing and Searching," Jan. 1, 1999, pp. 191-228, XP-002457291. (38 pages).
International Preliminary Report on Patentability (Chapter 1), mailing date May 10, 2013, for corresponding International Application No. PCT/US2011/056962, 7 pages.

*Primary Examiner* — Apu Mofiz
*Assistant Examiner* — Thu Nga Nguyen
(74) *Attorney, Agent, or Firm* — Blakely, Sokoloff, Taylor & Zafman LLP (57) ABSTRACT According to one aspect of the invention, in response to one or more terms to be indexed, each of the terms is indexed in a regular index. In addition, for each of the terms having multiple characters, at least one prefix portion of the term is indexed in a prefix index, where the regular index is used for regular searches and the prefix index is used for prefix searches without having to combine a plurality of postings lists of the regular index at the point in time.

20 Claims, 5 Drawing Sheets

METHODS FOR PREFIX INDEXING

This application is a continuation of co-pending U.S. application Ser. No. 12/913,509 filed on Oct. 27, 2010.

FIELD OF THE INVENTION

Embodiments of the invention relate generally to the field of indexing and searching of data; and more particularly, to prefix indexing for prefix searches.

BACKGROUND

Modern data processing systems, such as general purpose computer systems, allow the users of such systems to create a variety of different types of data files. For example, a typical user of a data processing system may create text files with a word processing program such as Microsoft Word or may create an image file with an image processing program such as Adobe's Photoshop. Numerous other types of files are capable of being created or modified, edited, and otherwise used by one or more users for a typical data processing system. The large number of the different types of files that can be created or modified can present a challenge to a typical user who is seeking to find a particular file which has been created.

Modern data processing systems often include a file management system which allows a user to place files in various directories or subdirectories (e.g. folders) and allows a user to give the file a name. Further, these file management systems often allow a user to find a file by searching not only the content of a file, but also by searching for the file's name, or the date of creation, or the date of modification, or the type of file. An example of such a file management system is the hinder program which operates on Macintosh computers from Apple Computer, Inc. of Cupertino, Calif. Another example of a file management system program is the Windows Explorer program which operates on the Windows operating system from Microsoft Corporation of Redmond, Wash. Both the Finder program and the Windows Explorer program include a find command which allows a user to search for files by various criteria including a file name or a date of creation or a date of modification or the type of file. This search capability searches through information which is the same for each file, regardless of the type of file. Thus, for example, the searchable data for a Microsoft Word file is the same as the searchable data for an Adobe Photoshop file, and this data typically includes the file name, the type of file, the date of creation, the date of last modification, the size of the file and certain other parameters which may be maintained for the file by the file management system.

Certain presently existing application programs allow a user to maintain data about a particular file. This data about a particular file may be considered metadata because it is data about other data. This metadata for a particular file may include information about the author of a file, a summary of the document, and various other types of information. Some file management systems, such as the Finder program, allow users to find a file by searching through the metadata.

In a typical system, the various content, file, and metadata are indexed for later retrieval using a program such as the Finder program, in what is commonly referred to as an inverted index. For example, an inverted index might contain a list of references to documents in which a particular word appears. Typically, during a prefix search of a search term, all postings lists that contain the search term are searched and used to build a union of all sets. Sometimes, there may be many postings list files associated with a term. For example, the terms that start with "a" may match many terms. As a result, many postings lists have to be searched and compiled, which significantly reduces the speed of the search.

SUMMARY OF THE INVENTION

According to one aspect of the invention, in response to one or more terms to be indexed, each of the terms is indexed in a regular index. In addition, for each of the terms having multiple characters, at least one prefix portion of the term is indexed in a prefix index, where the regular index is used for regular searches and the prefix index is used for prefix searches without having to combine a plurality of postings lists of the regular index at the point in time.

According to another aspect of the invention, a search query having a search term is received to search documents that contain the search term from a client. In response to the search query, it is determined whether the search is a prefix search. If the search is a prefix search, a prefix index is used to identify a single postings list associated with search term, where the single postings list includes item identifiers identifying all files that contain the search term as a prefix term. The item identifiers of the single postings list to the client.

Other features of the present invention will be apparent from the accompanying drawings and from the detailed description which follows.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

According to some embodiments, when a term is received for indexing, in addition to indexing the entire term in a regular index, at least one prefix portion of the term is also indexed in a prefix index. Thus, the regular index contains a postings list corresponding to the entire term as a whole having a list of identifiers identifying one or more items or files that contain the entire term. The prefix index contains a posting list corresponding to the prefix portion of the term having a list of identifiers identifying one or more items or files that contain the prefix portion of term. Subsequently, when a search query is received, if the search is a regular search, the regular index is used to obtain a list of items or files that contain a search term of the search query. If the search is a prefix search, the prefix index is utilized instead. As a result, during the prefix search, a single postings list may be utilized, while during a regular search multiple postings lists may have to be utilized. This in effect improves the efficiency of the prefix searches at the time of searching.

Figure 1:
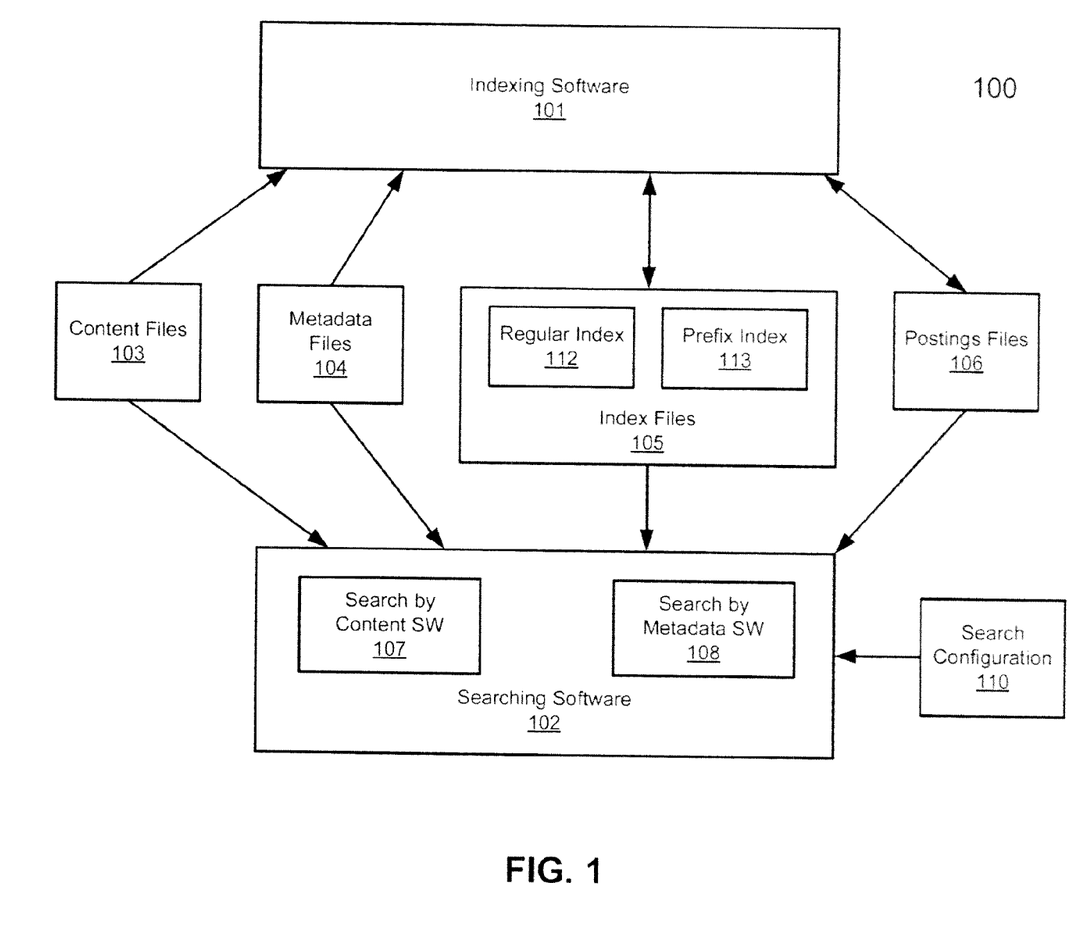
FIG. 1 is a block diagram illustrating an indexing and searching system according to one embodiment of the invention.

FIG. 1 is a block diagram illustrating an indexing and searching system according to one embodiment of the invention. Referring to FIG. 1, system 100 includes, but is not limited to, indexing software 101, searching software 102, and one or more system components such as a kernel of an operating system (OS), which is operatively coupled to the indexing software 102 and searching software 102, as well as other software programs. Searching software 102 includes a variety of searching programs such as search by content (also referred to as find by content) software 107, search by metadata (also referred to as find by metadata) software 108. For example, search by content software 107 and/or search by metadata software 108 may be implemented as part of a browsing program of any kind of operating systems, such as Finder™ program of Mac OS™ available from Apple Inc. of Cupertino, Calif.

In one embodiment, the find by content software 107 and/or the find by metadata software 108 is used to find a term present in content files 103 or metadata 104. For example, the software 107/108 may be used to find text and other information from word processing or text processing files created by word processing programs such as Microsoft Word, etc. Find by content software 107 and find by metadata software 108 are operatively coupled to databases which include one or more indexes 105. The indexes 105 represent at least a subset of the data files in a storage device, including file data 103 and metadata 104, and may include all of the data files in a particular storage device (or several storage devices), such as the main hard drive of a computer system. The one or more indexes 105 include an indexed representation of the content and/or metadata of each item stored on files 103/104, such as a text document, music, video, or other type of file. The find by content software 107 searches for a term in that content by searching through the one or more index files 105 to determine if the particular term, e.g., a particular word, is present in items stored on data files 103 which have been indexed. The find by content software functionality is available through find by metadata software 108 which provides the advantage to the user that the user can search the indexes 105 for the content 103 within an item stored on the data files 103 as well as any metadata 108 that may have been generated for the item.

In one embodiment of the invention, indexing software 101 is used to create and maintain the one or more indexes 105 that are operatively coupled to the find by content and metadata software applications 107/108. Among other functions, the indexing software 101 receives information obtained by scanning the content files 103 and metadata 104, and uses that information to generate one or more postings lists 106 that identifies an item (e.g., file) containing a particular term, or having metadata containing a particular term. As such, a postings list is a type of inverted index that maps a term, such as a search term, to the items identified in the list.

An inverted index (also referred to as postings file or inverted file) is an index data structure storing a mapping from content, such as words or numbers, to its locations in a database file, or in a document or a set of documents. The purpose of an inverted index is to allow fast full text searches, at a cost of increased processing when a document is added to the database. The inverted file may be the database file itself, rather than its index. It is one of the most popular data structures used in information retrieval systems. There are two main variants of inverted indexes: 1) record level inverted index (or inverted file index or just inverted file) contains a list of references to documents for each word; and 2) a word level inverted index (or full inverted index or inverted list) additionally contains the positions of each word within a document. The latter form offers more functionality (like phrase searches), but needs more time and space to be created.

The inverted index data structure is a central component of a typical search engine indexing algorithm. A goal of a search engine implementation is to optimize the speed of the query: find documents where a particular occurs. Once a forward index is developed, which stores lists of words per document; it is next inverted to develop an inverted index. Querying the forward index would require sequential iteration through each document and to each word to verify a matching document. The time, memory, and processing resources to perform such a query are not always technically realistic. Instead of listing the words per document in the forward index, the inverted index data structure is developed which lists the documents per word. With the inverted index created, the query can now be resolved by jumping to the associated word identifier (also referred to as an item identifier as described below) in the inverted index.

In one embodiment, the information obtained during the scan includes a unique identifier that uniquely identifies an item containing the particular term, or having metadata containing the term. For example, items such as a word processing or text processing file have unique identifiers, referred to as ITEMIDs. The ITEMIDs are used when generating the postings list (e.g., postings files 106) to identify those items that contain a particular term, such as the word "Apple." ITEMIDs identifying other types of files, such as image files or music files, may also be posted to one or more postings lists 106, in which case the ITEMED typically identifies items having metadata containing a particular term. In one embodiment, the indexing software 101 accumulates postings lists 106 for one or more terms into one or more update sets (not shown) and, from time to time, flushes the updates sets into one or more index files 105.

According to one embodiment, index 105 includes regular index 112 and prefix index 113, where regular index 112 is used for regular searches and prefix index 113 is used for prefix searches. When a term is received for indexing, in addition to indexing the entire term in regular index 112, at least one prefix portion of the term is also indexed in prefix index 113. Here, regular index 112 contains a postings list corresponding to the entire term as a whole having a list of identifiers one or more items or files that contain the entire term. Prefix index 113 contains a posting list corresponding to the prefix portion of the term having a list of identifiers identifying one or more items or files that contain the prefix portion of term. Subsequently, when a search query is received, if the search is a regular search, regular index 112 is used to obtain a list of items or files that contain a search term of the search query. If the search is a prefix search, prefix index 113 is utilized instead. Whether a search is a regular search or a prefix search may be determined based on search configuration 110, which may be part of the system and/or user configuration of system 100. As a result, during the prefix search, a single postings list may be utilized, while during a regular search multiple postings lists may have to be utilized. This in effect improves the efficiency of the prefix searches.

Figure 2:
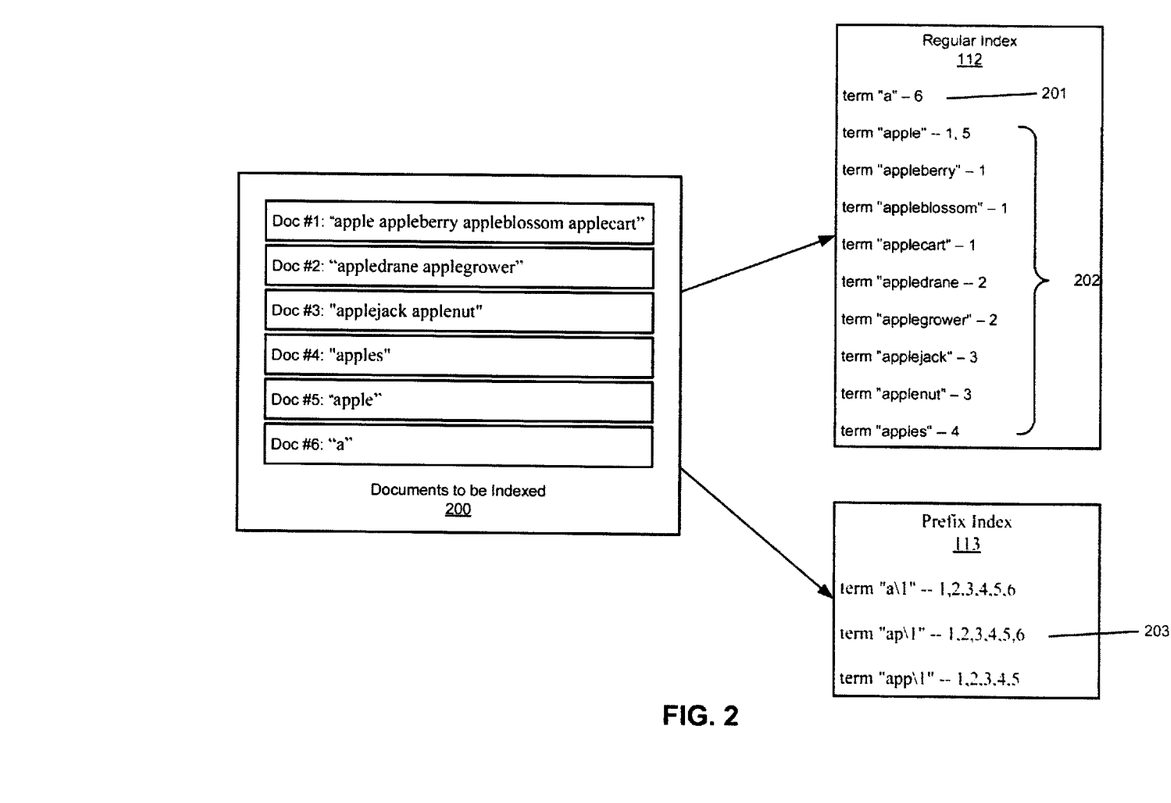
FIG. 2 is a diagram illustrating a process of prefix indexing according to one embodiment of the invention.

For example, as shown in FIG. 2, it is assumed that a list of documents 200 having one or more terms are used to create regular index 112 and prefix index 113 of FIG. 1 by indexing software 101. During the indexing phase, all terms of documents 200 are indexed to create regular index 112. In addition, at least certain prefix portions of the terms are used to create prefix index 113. A prefix portion typically includes the leading character of the term and one or more continuously adjacent characters in sequence of the term. For example, a term of "apple" can include prefix portions of "a", "ap", "app", "appl", and "apple." In this example, for the purpose of illustration, prefix portions of "a", "ap", and "app" are used to create the corresponding prefix indices. When an index is stored, the index may include a marker or signature to indicate that the respective index is a prefix index. In this example, a special marker '\1' may be used to indicate that the associated index is a prefix index.

Subsequently, during the searching phase, when a search term is received for searching purposes, processing logic may determine whether the search is a regular search or a prefix search, for example, based on the system and/or user configuration. In many situations, a default search type is a prefix search. If the search is a regular search, regular index 112 is utilized, while prefix index 113 is used in a prefix search.

For example, when a user is typing "ap" in a search field, substantially instantly, a search term of "ap" may be received by the search software, such as searching software 102 of FIG. 1. The searching software is configured to determine whether the search is a regular search or a prefix search based on the search configuration of the system. If the search is a regular search, regular index 112 is utilized. In this example, all postings lists 202, except posting list 201, may be searched and identified. The document identifiers of postings lists 202 can then be combined or compiled into a search result to be returned to a client that initiated the search. When a search term is short such as "a" or "ap", the postings lists 202 could be large and the time to compile the lists could take much longer.

However, if the search is a prefix search, instead of using regular index 112, prefix index 113 is utilized. In the above example, in response to a search term of "ap", postings list 203 (e.g., "ap\1") of prefix index 113 is used, where '\1' is an example of a marker or signature used herein to indicate that postings list 203 is part of prefix index 113. In this situation, only one postings list 203 is utilized, without having to search multiple postings lists 202 of regular index 112 and to compile the same. As a result, the speed of searching is significantly improved. Thus, although it may take a longer time to index prefix index 113 and/or more space to store prefix index 113 during the indexing phase, a higher efficiency of searching can be achieved during the searching phase.

In one embodiment, the prefix match with the index may employ a data structure called a trie. A trie is a tree structure in which each node of the tree resolves one character of the string being matched. Each internal node consists of a list of characters. Associated with each character is an outgoing link either to another internal node or to a leaf node. Each leaf node holds the result data associated with the prefix leading to that leaf node. To search the trie, one starts at the root node and traverses the tree by following the outgoing link at each node corresponding to the next character in the string to be matched. When no matching outgoing link can be found, the matching prefix has been found.

Note that regular index 112 and prefix index 113 may be stored in the same file or storage location, where there is a marker or signature within the indexes indicating whether a particular index is a regular index vs. a prefix index. For example, a prefix index may contain a marker similar to character of '\1' as described above.

Figure 3:
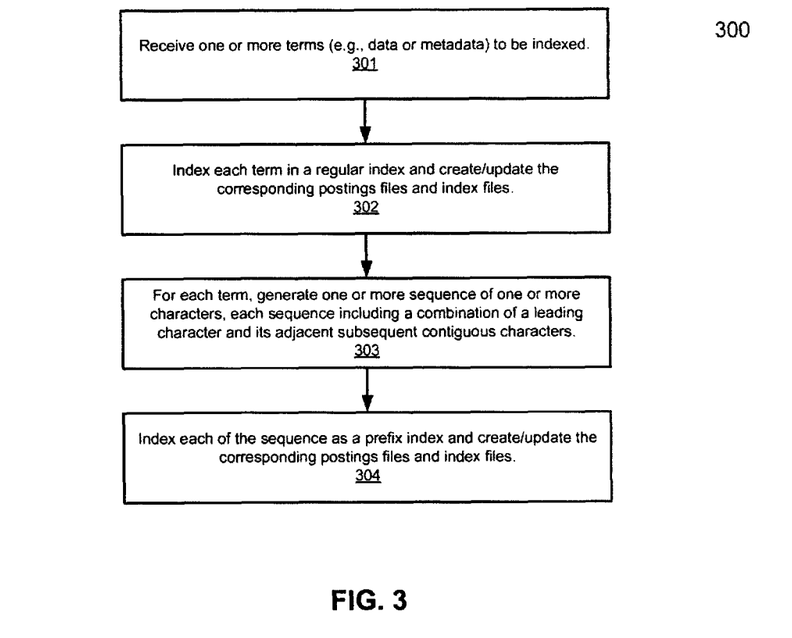
FIG. 3 is a flow diagram illustrating a method for prefix indexing according to one embodiment of the invention.

FIG. 3 is a flow diagram illustrating a method for prefix indexing according to one embodiment of the invention. For example, method 300 may be performed by indexing software 101 of FIG. 1. Referring to FIG. 3, at block 301, a file having one or more terms is received for indexing. The one or more terms may be extracted from content data or metadata of the file. In response, at block 302, at least one term of the file is indexed in a regular index and the associated postings lists are created or updated accordingly. In addition, at block 303, for each term, one or more sequences of one or more characters are generated, where each sequence includes a combination of a leading character and its one or more adjacent subsequent continuous characters (e.g., prefix portion). At block 304, each of the sequences is indexed in a prefix index and associated postings lists are crated or updated accordingly.

Figure 4:
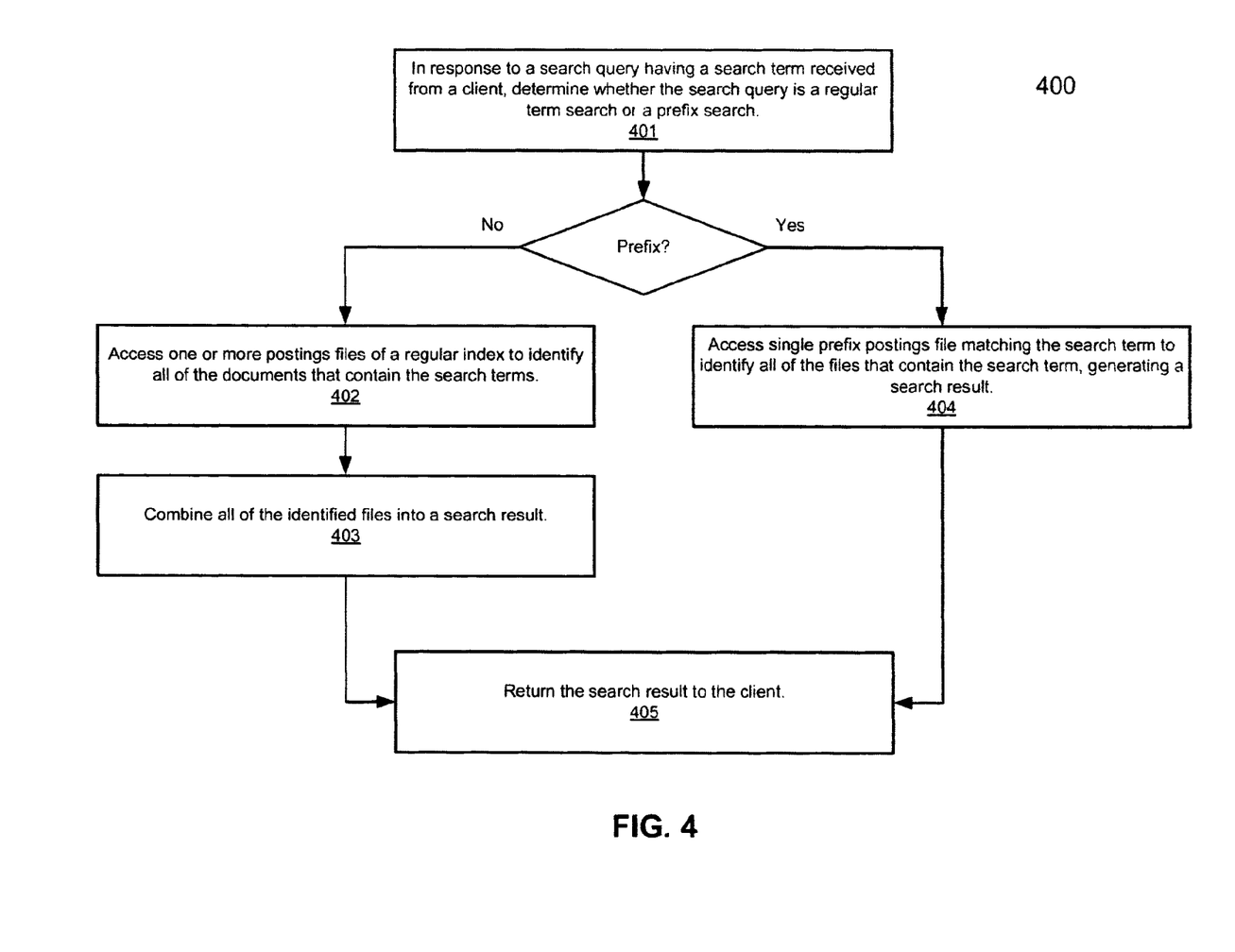
FIG. 4 is a flow diagram illustrating a method for searching according to one embodiment of the invention.

FIG. 4 is a flow diagram illustrating a method for searching according to one embodiment of the invention. For example, method 400 may be performed by searching software 102 of FIG. 1. Referring to FIG. 4, at block 401, in response to a search query having a search term received from a client, it is determined whether the search is a regular search or a prefix search. If the search is a regular search, at block 402, one or more postings files corresponding to the search term in a regular index are accessed to identify all the files that contain the search term. At block 403, the identifiers of the one or more postings files are combined or compiled, generating a search result. At block 405, the search result is returned to the client. If, however, at block 401, it is determined that the search is a prefix search, at block 404, a single postings file of a prefix index corresponding to the search term is access to identify all of the files that contain the search term, generating a search result. At block 405, the search result is returned to the client.

Figure 5:
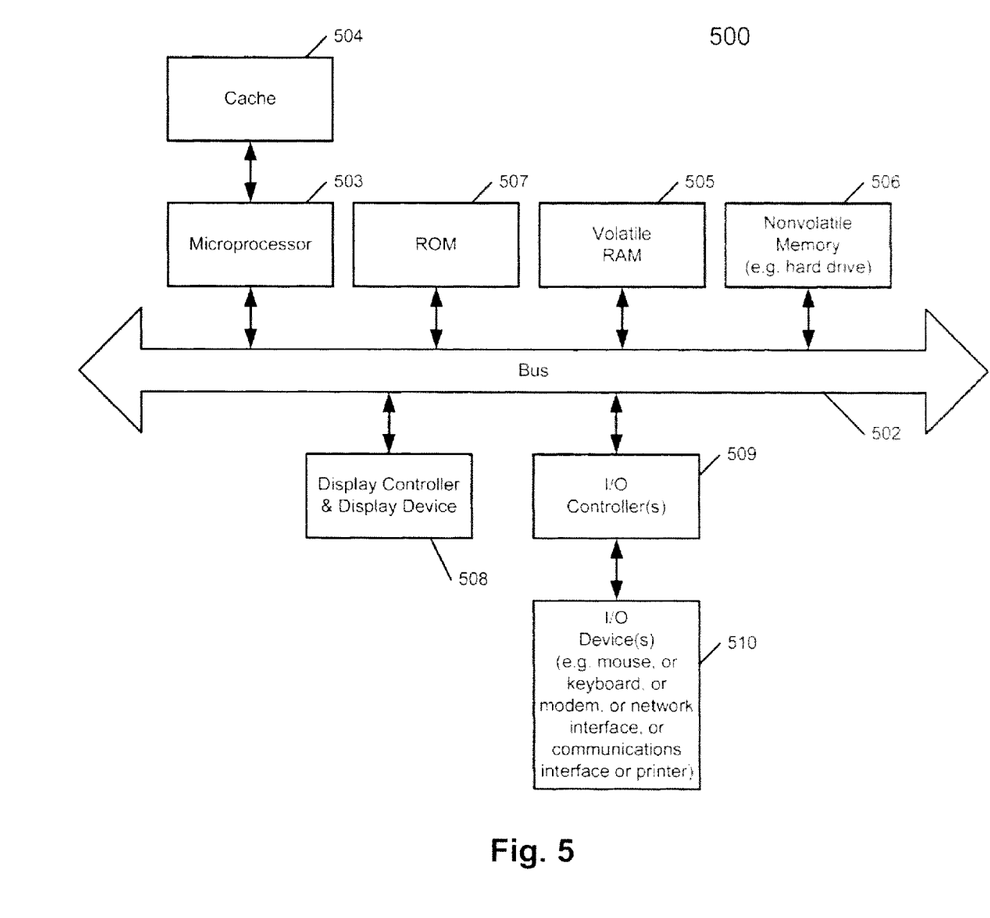
FIG. 5 is a block diagram of a data processing system, which may be used with one embodiment of the invention.

FIG. 5 is a block diagram of a data processing system, which may be used with one embodiment of the invention. For example, the system 500 may be used as system 100 of FIG. 1. Note that while FIG. 5 illustrates various components of a computer system, it is not intended to represent any particular architecture or manner of interconnecting the components; as such details are not germane to the present invention. It will also be appreciated that network computers, handheld computers, cell phones and other data processing systems which have fewer components or perhaps more components may also be used with the present invention. The computer system of FIG. 5 may, for example, be an Apple Macintosh computer or MacBook, or an IBM compatible PC.

As shown in FIG. 5, the computer system 500, which is a form of a data processing system, includes a bus or interconnect 502 which is coupled to one or more microprocessors 503 and a ROM 507, a volatile RAM 505, and a non-volatile memory 506. The microprocessor 503 is coupled to cache memory 504. The bus 502 interconnects these various components together and also interconnects these components 503, 507, 505, and 506 to a display controller and display device 508, as well as to input/output (I/O) devices 510, which may be mice, keyboards, modems, network interfaces, printers, and other devices which are well-known in the art.

Typically, the input/output devices 510 are coupled to the system through input/output controllers 509. The volatile RAM 505 is typically implemented as dynamic RAM (DRAM) which requires power continuously in order to refresh or maintain the data in the memory. The non-volatile memory 506 is typically a magnetic hard drive, a magnetic optical drive, an optical drive, or a DVD RAM or other type of memory system which maintains data even after power is removed from the system. Typically, the non-volatile memory will also be a random access memory, although this is not required.

While FIG. 5 shows that the non-volatile memory is a local device coupled directly to the rest of the components in the data processing system, the present invention may utilize a non-volatile memory which is remote from the system; such as, a network storage device which is coupled to the data processing system through a network interlace such as a modem or Ethernet interface. The bus 502 may include one or more buses connected to each other through various bridges, controllers, and/or adapters, as is well-known in the art. In one embodiment, the I/O controller 509 includes a USB (Universal Serial Bus) adapter for controlling USB peripherals. Alternatively, I/O controller 509 may include an IEEE-1394 adapter, also known as FireWire adapter, for controlling FireWire devices.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form, readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method for indexing one or more terms, comprising:

in response to one or more terms to be indexed, indexing each of the one or more terms in a regular index, the regular index having a plurality of postings lists and each postings list corresponding to a string containing one of the one or more terms;

for each of the one or more terms having a plurality of characters, indexing at least one prefix portion of each term in a prefix index that is processed separately from the regular index, wherein the regular index is used for regular searches, and wherein the prefix index is used for prefix searches without having to combine the plurality of postings lists of the regular index in response to a search query;

receiving a search query having a search term for searching files that contain the search term from a client;

determining whether a search to be performed is a regular search or a prefix search;

if the search is a regular search,
searching in the regular index to identify a plurality of postings lists, each containing the search term, and
returning to the client, a list of item identifiers from the plurality of postings lists obtained from the regular index; and if the search is a prefix search,
searching in the prefix index to identify a single postings list that exactly matches the search term, and
returning to the client, a list of item identifiers from the single postings list.

2. The method of claim 1, wherein the prefix portion of a term comprises a leading character and at least one adjacent character of the term.

3. The method of claim 1, wherein each of the terms in the regular index and the prefix index is associated with a postings list having one or more items identifiers identifying one or more files that contain the associated term.

4. The method of claim 1, wherein the one or more terms to be indexed are extracted from at least one of a content data file and metadata of the content data file.

5. The method of claim 1, wherein the regular index and the prefix index are inverted indexes.

6. The method of claim 1, wherein the regular index and the prefix index are stored in the same file, and wherein each prefix entry of the prefix index is tagged with a marker indicating that the corresponding prefix entry is part of prefix index.

7. The method of claim 1, wherein the search term for the prefix search is captured and received as a user is typing in a search field.

8. A non-transitory computer-readable storage medium having instructions stored therein, which when executed by a computer, cause the computer to perform a method for indexing one or more terms, the method comprising:

in response to one or more terms to be indexed, indexing each of the one or more terms in a regular index, the regular index having a plurality of postings lists and each postings list corresponding to a string containing one of the one or more terms;

for each of the one or more terms having a plurality of characters, indexing at least one prefix portion of each term in a prefix index that is processed separately from the regular index, wherein the regular index is used for regular searches, and wherein the prefix index is used for prefix searches without having to combine a plurality of postings lists of the regular index in response to a search query;

receiving a search query having a search term for searching files that contain the search term from a client;

determining whether a search to be performed is a regular search or a prefix search;

if the search is a regular search,
        searching in the regular index to identify a plurality of postings lists, each containing the search term, and
        returning to the client, a list of item identifiers from the plurality of postings lists obtained from the regular index; and     if the search is a prefix search,
        searching in the prefix index to identify a single postings list that exactly matches the search term, and
        returning to the client, a list of item identifiers from the single postings list.

9. The non-transitory computer-readable storage medium of claim 8, wherein the prefix portion of a term comprises a leading character and at least one adjacent character of the term.

10. The non-transitory computer-readable storage medium of claim 8, wherein each of the terms in the regular index and the prefix index is associated with a postings list having one or more item identifiers identifying one or more files that contain the associated term.

11. The non-transitory computer-readable storage medium of claim 8, wherein the one or more terms to be indexed are extracted from at least one of a content data file and metadata of the content data file.

12. The non-transitory computer-readable storage medium of claim 8, wherein the regular index and the prefix index are inverted indexes.

13. The non-transitory computer-readable storage medium of claim 8, wherein the regular index and the prefix index are stored in the same file, and wherein each prefix entry of the prefix index is tagged with a marker indicating that the corresponding prefix entry is part of prefix index.

14. The non-transitory computer-readable storage medium of claim 8, wherein the search term for the prefix search is captured and received as a user is typing in a search field.

15. A data processing system, comprising:
a processor; and
a memory coupled to the processor for storing instructions, which when executed by
    the processor, cause the processor to perform a method, the method including
    in response to one or more terms to be indexed, indexing each of the one or more terms in a regular index, the regular index having a plurality of postings lists and each postings list corresponding to a string containing one of the one or more terms,
    for each of the one or more terms having a plurality of characters, indexing at least one prefix portion of each term in a prefix index that is processed separately from the regular index, wherein the regular index is used for regular searches, and wherein the prefix index is used for prefix searches without having to combine the plurality of postings lists of the regular index in response to a search query,
    receiving a search query having a search term for searching files that contain the search term from a client,
    determining whether a search to be performed is a regular search or a prefix search,
    if the search is a regular search,
        searching in the regular index to identify a plurality of postings lists, each containing the search term, and
        returning to the client, a list of item identifiers from the plurality of postings lists obtained from the regular index, and
    if the search is a prefix search,
        searching in the prefix index to identify a single postings list that exactly matches the search term, and
        returning to the client, a list of item identifiers from the single postings list.

16. The system of claim 15, wherein the prefix portion of a term comprises a leading character and at least one adjacent character of the term.

17. The system of claim 15, wherein each of the terms in the regular index and the prefix index is associated with a postings list having one or more items identifiers identifying one or more files that contain the associated term.

18. The system of claim 15, wherein the one or more terms to be indexed are extracted from at least one of a content data file and metadata of the content data file.

19. The system of claim 15, wherein the regular index and the prefix index are inverted indexes.

20. The system of claim 15, wherein the regular index and the prefix index are stored in the same file, and wherein each prefix entry of the prefix index is tagged with a marker indicating that the corresponding prefix entry is part of prefix index.

\* \* \* \* \*